(12) United States Patent
Stratton et al.

(10) Patent No.: US 6,553,307 B2
(45) Date of Patent: Apr. 22, 2003

(54) AIRPORT GROUND-CONTROL SYSTEM AND METHOD

(76) Inventors: Richard L Stratton, 16544 SW. Royalty Pkwy., Portland, OR (US) 97224; Richard E Foy, 4018 Dry Creek Rd., Medford, OR (US) 97504

( * ) Notice: Subject to any disclaimer, the term of this patent is extended or adjusted under 35 U.S.C. 154(b) by 0 days.

(21) Appl. No.: 10/003,627

(22) Filed: Oct. 31, 2001

(65) Prior Publication Data

US 2002/0120392 A1 Aug. 29, 2002

Related U.S. Application Data

(60) Provisional application No. 60/267,221, filed on Feb. 7, 2001.

(51) Int. Cl.$^7$ ............................................... G06F 19/00
(52) U.S. Cl. ........................ 701/120; 701/209; 701/301
(58) Field of Search ........................... 701/1, 120, 200, 701/300, 207, 301, 209, 208, 211, 212, 213; 340/951

(56) References Cited

U.S. PATENT DOCUMENTS

| | | |
|---|---|---|
| 3,870,994 A | 3/1975 | McCormick et al. |
| 4,896,154 A | 1/1990 | Factor et al. |
| 5,014,206 A | 5/1991 | Scribner et al. |
| 5,146,219 A | 9/1992 | Bosch |
| 5,153,836 A | 10/1992 | Fraughton et al. |
| 5,311,197 A | 5/1994 | Sorden et al. |
| 5,325,302 A | 6/1994 | Izidon |
| 5,334,982 A | 8/1994 | Owen |
| 5,381,140 A | 1/1995 | Kuroda et al. |
| 5,504,482 A | 4/1996 | Schreder |
| 5,539,398 A | 7/1996 | Hall et al. |
| 5,557,524 A | 9/1996 | Maki |
| 5,596,332 A | 1/1997 | Coles et al. |
| 5,714,948 A | 2/1998 | Farmakis et al. |
| 5,872,526 A | 2/1999 | Tognazzini |
| 5,983,161 A | 11/1999 | Lemelson et al. |
| 6,044,323 A | 3/2000 | Yee et al. |
| 6,246,342 B1 * | 6/2001 | Vandevoorde et al. ...... 340/953 |
| 6,487,500 B2 * | 11/2002 | Lemelson ................... 701/301 |

* cited by examiner

*Primary Examiner*—Richard M. Camby
(74) *Attorney, Agent, or Firm*—Kolisch Hartwell, P.C.

(57) ABSTRACT

A ground traffic control system for use in controlling the movement of an aircraft and various other vehicles on the grounds of an airport. The system and methodology involve, with regard to aircraft, the precursor transmission of a full packet of travel-route information (routes and waypoints) that is sent, according to operation of the system, as a singularity just prior to controlled travel of an aircraft. Portions of assigned travel routes that are based upon an assembly of waypoint-to-waypoint data are clearly communicated to an aircraft crew, including communication via specific visual mapping data and are armed with the capability of informing a crew visually exactly where it is in relation to assigned travel instructions. Similar methodology, enabled similar system structure, is used for the control of other airport-related vehicles.

19 Claims, 3 Drawing Sheets

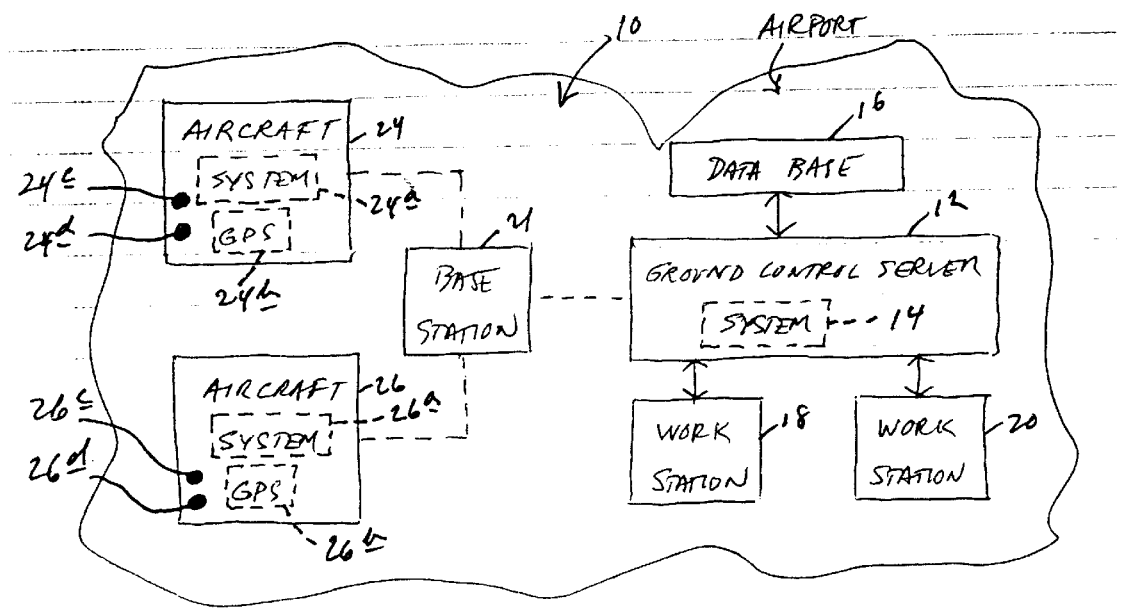
FIG. 1
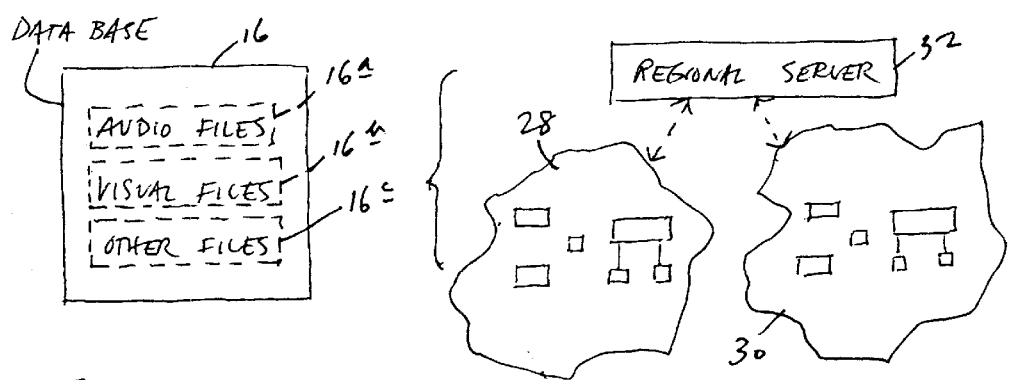
FIG. 2
FIG. 3

AIRPORT GROUND-CONTROL SYSTEM AND METHOD

CROSS REFERENCE TO RELATED APPLICATION

This application claims priority to U.S. Provisional Application Ser. No. 60/267,221 filed Feb. 7, 2001 titled "Aircraft (or Other Vehicle) Ground-Control Data-Transmission/-Reception System for Managing Ground Travel Activities", and is herein incorporated by reference.

BACKGROUND AND SUMMARY OF THE INVENTION

This invention pertains to an aircraft and support vehicle ground-control system and related methodology for controlling the travel of aircraft and other vehicles, such as fuel trucks, on the grounds of an airport. In particular, it relates to such a system and methodology which, in the case of aircraft is based upon the transmission to the crew on board an aircraft of a full preliminary packet of ground-travel instructions. Support ground vehicles are monitored continually, and as will be explained below, are furnished with much of the same kind of information provided to an aircraft. Ground-control instructions can then be followed and monitored without the necessity, except in certain special circumstances which will be described below, of requiring any further real-time voice communication between an aircraft's crew, or the operator of a ground vehicle, and an airport ground controller.

Referring first now to aircraft control, under widespread current practice of implementing aircraft ground control, such control typically takes place via back-and-forth radio transmissions between the crew on board an aircraft and a ground controller. It is well known in the art that it is a very challenging task for a ground controller, especially in the usual setting where each ground controller may have responsibility for controlling, essentially simultaneously, up to as many as two dozen or more aircraft on the ground. In this presently typical environment, the airwaves utilized by aircraft crews and ground-control personnel are filled, substantially throughout the entireties of aircraft travel from starting points to destinations, with a dense content of cross-communications, with respect to which confusion, misunderstandings and errors frequently, and sometimes dangerously, arise. Further, most current radio-voice-active control is implemented with communication equipment which operates in a simplex, channel-blocking manner—a practice which allows only a single aircraft crew at a time to converse with a ground controller. In such a setting, the attention of a ground controller is effectively demanded, substantially simultaneously (but on a crowded one-by-one basis) from multiple aircraft, in a manner requiring that controller to converse, perhaps frequently, with each of several different aircraft crews throughout the entirety of the ground travels of those aircraft which are in a ground-controlled situation.

When one takes the above into account, the well-known difficulty that can sometimes occur with respect to understanding exactly what someone has said over a dense radio link, along with a recognition that high volumes of international traffic aircraft crews whose native languages may be one of many different languages, the opportunity for difficult problems to arise is significant. At the very least, the usual ground-control environment today is filled with stress.

Added to the clear complexity of current ground controller to aircraft crew communication, also to be concerned with is the necessity for ground controllers to control the coordinated positioning and movement of ground-support vehicles. This further requirement significantly complicates and densities ground-control communications.

According to a preferred embodiment of the system of this invention, and of the preferred methodology for implementing it, and as such relates to aircraft, at a point in time which precedes actual aircraft travel on the ground, from a starting point to a destination point, there is a preliminary delivery of a full package of assembled, aircraft-specific-tailored, instructional ground-travel information. This delivery is made (under computer control) from a ground controller to the crew on board an aircraft. The full, assembled package requires no direct voice-to-voice communication between a ground controller and any crew member within an aircraft.

Thereafter, this package of full instructions is available on board an aircraft throughout that aircraft's ground travel activity, and without necessarily requiring any later, ongoing, back-and-forth verbal communication between a ground controller and members in an aircraft's crew.

Made available through computer structures that are operating essentially under the control of one or more ground controllers, an instructional package that is delivered according to this invention to the crew on board an aircraft results from the assembly of a package of instructions drawn in data groups selected from a predefined and elaborate ground-control database that has been established. This database includes prerecorded audio files, visual-data files, text files and perhaps other files, which can provide a full instructional package for each controlled aircraft—a package fully relating to a specific travel route chosen for the aircraft by a ground controller. Audio files in this database are preferably voice files, and these files may be in any one of a number of different languages to include detailed and explicit verbal directions for movement between predefined travel waypoints. The detail and rich content of such aural files are not limited by today's need to forecast clipped brevity over real-time, live, crowded air channels. The mentioned visual-data files contain map representations of the grounds of a specific airport, marked with waypoints and travel routes between such points. Regarding such waypoints and routes, specific routes, or paths, between adjacent selected waypoints are characterized with instructions regarding, inter alia, speed of travel, lateral dimensions of the travel path and spatial coordinate information that can relate aircraft position to exact location on and along a route between waypoints.

On board an aircraft equipped to implement the system and methodology of this invention is computer structure which is designed to receive and deliver the transmitted information appropriately to the aircraft's crew. Also onboard such an aircraft is any one of a number of different spatial position-locating systems, such as the well known GPS systems.

Controlled ground vehicle are similarly equipped to practice the present invention with appropriate system equipment constructed in accordance with the invention, and appropriate position-locating structure. Unlike controlled aircraft, of course, ground vehicles receive (where necessary) delivered instructional packages based upon a host of different stunting and end points for travel on an airport's grounds, and also in relation to assigned, normal "zones" for operation.

Various specific features and advantages offered by the invention will become more apparent as the detailed description which now follows is read in conjunction with the accompanying drawings. The system and methodology of the invention are principally illustrated and described hereinbelow with reference (for illustration purposes) to aircraft.

DESCRIPTION OF THE DRAWINGS

FIG. 1 is a block/schematic diagram illustrating an airport and two separate aircraft on the grounds of that airport which include structure, and which practice methodology, in accordance with the present invention.

FIG. 2 is a schematic/block diagram illustrating, generally, the make up of what is referred to herein as a database of informational instructions that will be relayed from a ground controller's work station to different aircraft, such as the two aircrafts generally shown in FIG. 1.

FIG. 3 illustrates a system constructed in accordance with the present invention wherein practice of the invention is enabled by a regional facility which works in conjunction with plural airports, two of which are shown generally and schematically in FIG. 3.

DETAILED DESCRIPTION OF, AND BEST MODE FOR CARRYING OUT, THE INVENTION

Figure 4:
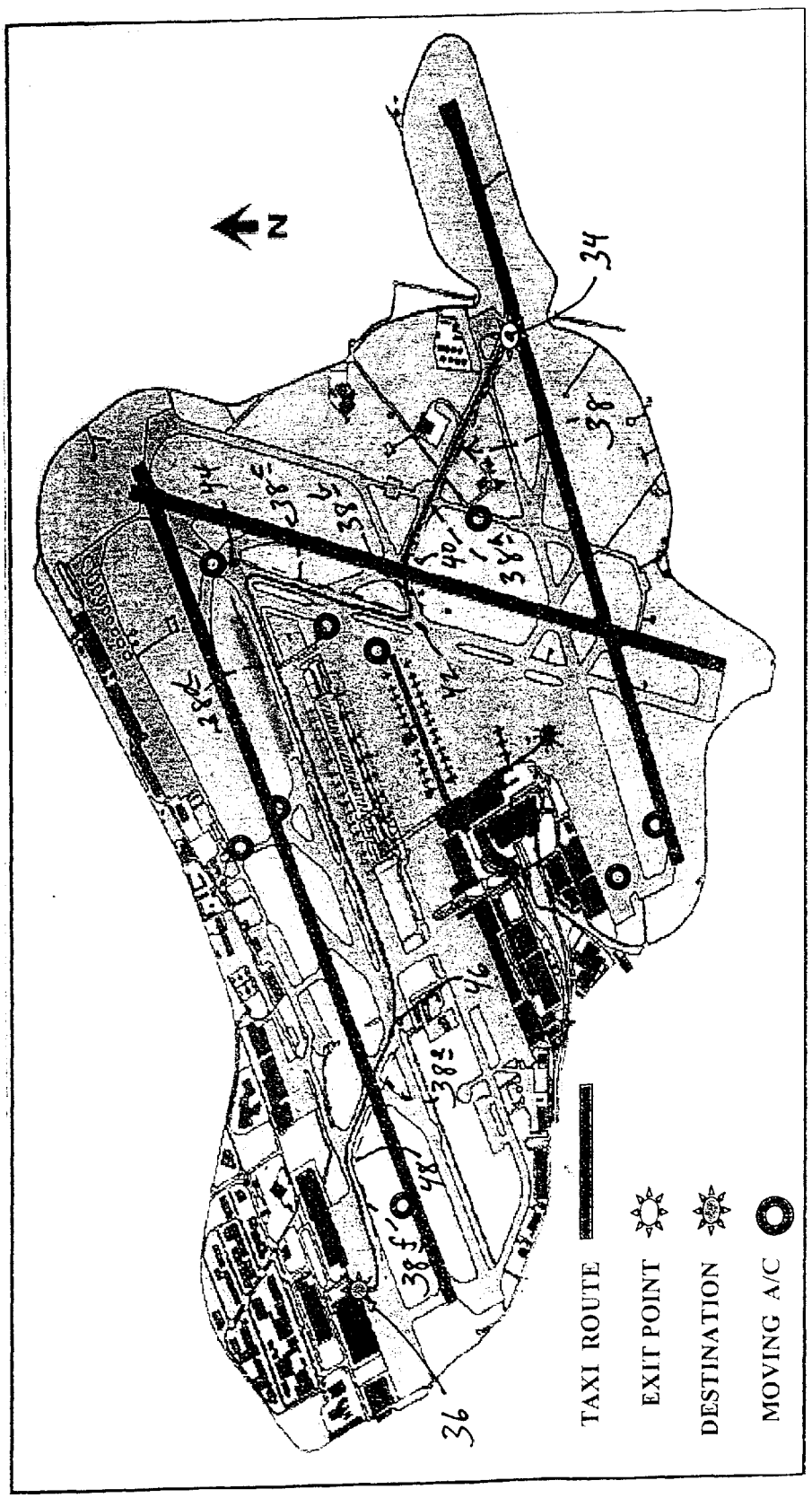
FIG. 4 is a plan view layout or map of an airport utilizing the present invention, and very specifically, it is a map, at least portions of which are made available to the crew on board an aircraft at a moment in time just prior to implementing ground-control travel at the airport.

Turning now to the drawings, and referring first of all to FIGS. 1 and 2, indicated generally and fragmentarily at 10 in FIG. 1 are the grounds of an airport with respect to which the system and methodology of the present invention have been installed and are practiced. With regard to the airport per se, included in the system of this invention at the site, for example, of a ground-control facility, are a ground-control server 12 equipped at 14 with a system that has been constructed in accordance with the present invention. Also present generally at the location of server 12 is a database 16 that has been constructed in accordance with the invention. Shown at 18, 20 are two of many different work stations which are managed by individual ground controllers. These components are also referred to herein as computer structure.

Also located, in the situation now being described, on-site at airport 10 is a base communication station 22. This base station can take any one of a number of different conventional forms, and herein taken the form of the Internet, along with the usual supporting software and hardware which enables access for communication through that station between the computer structure present at the airport, and systems that are installed on board different aircraft in accordance with the present invention.

Directing attention for just a moment to FIG. 2, here what is illustrated is generally the make-up of database 16. This database includes, inter alia, audio files 16a, visual files 16b and other files, such as text files, 16c. According to the present invention, and with respect to the specific embodiment thereof now being described and illustrated, audio files 16a take the form of transmittable pre-recorded voice files that contain detailed verbal directions for instructing the travel of an aircraft, and specifically direction that relate to movement of the aircraft between defined waypoints at airport 10 along a route for travel which, as will be explained shortly, has been assigned to an aircraft by a monitoring ground controller. Thus, and for example, these audio files might contain an instruction to move from waypoint X to waypoint Y along a path having a defined default control width, say about 50-feet, and to travel along that path, within that control width, at no more than a certain speed, and on arriving at the second waypoint (Y) to follow a next set of instructions. The visual files according to this invention include both signal-light data, and map data which are relevant to each one of the many different routes between waypoints that can describe an assigned travel route for an aircraft on the ground. These files may respectively embrace different overall areas of a controlled airport, could include map data showing the entire layout of an aircraft, but more preferably contain sub-maps that are specifically related, on a waypoint-to-waypoint basis, regarding a specific route between two waypoints. Signal-light data is employed to "instruct" system-related warning lights installed in an aircraft when and how to light-up.

Files 16c can include any other form of transmittable, travel-instruction data, for example, text that can overlap with the verbal content contained in audio files 16a.

Returning attention now to FIG. 1, shown at 24, 26 are two different aircraft which are located at different spots on the grounds of airport 10. Installed on board these aircraft are computer systems, or system components, 24a, 26a constructed in accordance with the present invention, including visual display structure for presenting map and related displays on a screen. Also on board each aircraft is a conventional position-locating system, such as GPS navigational systems 24b, 26b. Included within systems 24a, 26a, are control signal lights, such as those shown at 24c, 24d, 26c, 26d.

Systems 24a, 26b are designed to respond to communications received from the airport computer structure (previously described) via Internet base station 21.

Digressing for just a moment to speak about FIG. 3, here, two airports are fragmentarily and schematically represented at 28, 30. On the grounds of each of these airports is system structure like that pictured in FIG. 1 for airport 10. Here, however, airports 28, 30 are linked to a regional computer server shown at 32, at the location of which a database, somewhat like database 16, is present with audio files, visual files and other files that relate individually to the two associated airports (28, 30).

As was mentioned earlier, an interesting and important feature of the present invention is that, with the same installed at an airport, and also within different aircraft that use that airport, when an aircraft is ready to begin its ground travel at the associated airport, a ground controller, working through a work station like stations 18, 20, assembles from database 16, or the like, a package of instructional materials that fully define a selected route of travel to a destination on a waypoint-by-waypoint basis. This package of information is delivered as a totality, and as a precursor to aircraft controlled travel. The information delivered is complete enough for a crew on board an aircraft successfully to implement all relevant ground-control instructions, without necessarily ever having to hold ongoing voice communication with a ground controller.

In general terms, when there has been a transmission to system components on board an aircraft, such as aircraft 24, the crew on board the aircraft has access to the output of files like files 16*a*, 16*b*, 16*c*, which files issue the specific instructions that are to be followed by the associated aircraft from wherever it is (just prior to having received that transmission of instructions) to its ultimate destination. Preferably, and as has already been mentioned, the package of instructions that have been delivered to the aircraft are organized on a waypoint-by-waypoint manner so that the crew of the aircraft can focus attention preferably on specific instructions regarding a route section between two adjacent waypoints.

Looking for a moment at FIG. 4, indicated generally at 34 is the location of a subject aircraft in a condition on the grounds of airport 10, and just prior to beginning controlled ground travel to a destination which is marked at 36. Between locations 34 and 36, and in accordance with the transmitted instructional package, a route of travel, designated 38, has been laid out by a ground controller for controlling movement of the aircraft between points 34, 36. This route, which is illustrated by dashed lines in FIG. 4, is seen to include six route components 38*a*, 38*b*, 38*c*, 38*d*, 38*e*, 38*f*. These route components (legs) extend between different adjacent pairs of defined waypoints. Leg 38*a* lies between the starting waypoint 34 and a next waypoint 40. Leg 38*b* lies between waypoint 40 and a waypoint 42. Leg 38*b* lies between waypoint 40 and a waypoint 42. Leg 38*c* lies between waypoint 42 and another waypoint 44. Leg 38*d* lies between waypoint 44 and a waypoint 46. Leg 38*e* lies between waypoint 46 and another waypoint 48, and leg 38*f* lies between waypoint 48 and destination waypoint 36.

According to the invention, what will always be made available by way of sound and visual information to a crew on board an aircraft will be all operational ground-travel instructions that relate to any uncompleted leg between points 34, 36. After an aircraft has completed travel between two waypoints, i.e., along a specific leg, information regarding that leg, that is instructional information, is suitably deleted from further availability through appropriate deletion structure which is resident in the system part of the present invention that is installed in an aircraft. Such deletion prevents the possibility of a crew inadvertently picking up an instruction from a prior-completed task as an indication of following (erroneously) a next-to-complete travel task.

With respect to route 38, preferably what is presented at any moment in time visually to an aircraft crew is just a map picture relating exactly to the layout of the grounds of the airport between each two next-adjacent waypoints. In other words, and with regard to aircraft 24 awaiting to move from point 34 to point 36, what will first be seen visually on an appropriate display screen on the flight deck of the aircraft is a map portion in the form generally of a strip map which pictures the grounds of the airport between points 34, 40 (i.e., leg 38*a*). Further, according to the present invention, once an aircraft has received a transmission of control instructions from a ground controller via the ground-control system components of the present invention, the GPS system on board the aircraft constantly monitors the exact position of the aircraft on the grounds of the airport, and a suitable and moveable display marker, which might be a point of light on the on board display screen, is employed to illustrate, on the presented map data, exactly where the aircraft is at every given moment of time. This same information is communicated by Internet communication to the system components under the control and observation of the associated ground controller.

Further, appropriate signal lights provided in an aircraft according to the invention are readied to light-up if certain kinds of travel situations arise.

Thus, and as an aircraft begins to travel along portions of its assigned travel route, the crew is presented with an image on the screen which shows how the aircraft is progressing. Data which is also made available, both on board the aircraft and to the associated ground controller, may include information regarding aircraft ground-speed and direction of motion.

When an aircraft, such as aircraft 24 with respect to route 38, has completed a leg in that route, such as leg 38*a*, all data which was previously transmitted for use in controlling airport travel regarding movement along leg 38*a* is deleted. It is no longer available for reference and possible error and confusion. What is next presented in the case now specifically being described is the next route leg 38*b*, along with appropriate audio and text files, to guide and control aircraft travel between waypoints 40, 42.

With regard to travel along a route leg under control of the operation of the system of this invention, until a specific leg has been completed, at any time during travel along that leg, a member of the crew in the aircraft can call up to rehear, for example, and revisit the specific instructions that have been transmitted to control travel in that leg. And so, if a particular set of instructions has been partially forgotten, no voice control with the ground controller is necessary. Rather, what an aircraft's crew people do at that point in time is simply to ask for a "replay" of those portions of the previously transmitted instructions that relate to the current leg.

In the event that an aircraft deviates from the assigned travel route, or from other travel parameters, a warning signal of any appropriate nature (such as lighting-up of one or more of the system signal lights mentioned above) is presented both to the crew on board the subject aircraft and preferably also to the associated ground controller. If required, the ground controller may elect to retransmit to the aircraft a new set of instructions that relate to the balance of the route to be followed—a new set of instructions which deal with the deviation which may have occurred. In any event, if something develops that requires a change in instructions or route or both that are not dictated by some aircraft movement deviation, a ground controller has completely the option to transmit a completely new package of information including information regarding instructing an aircraft to finish its travel route along various different subcomponents of a route.

Figure 5:
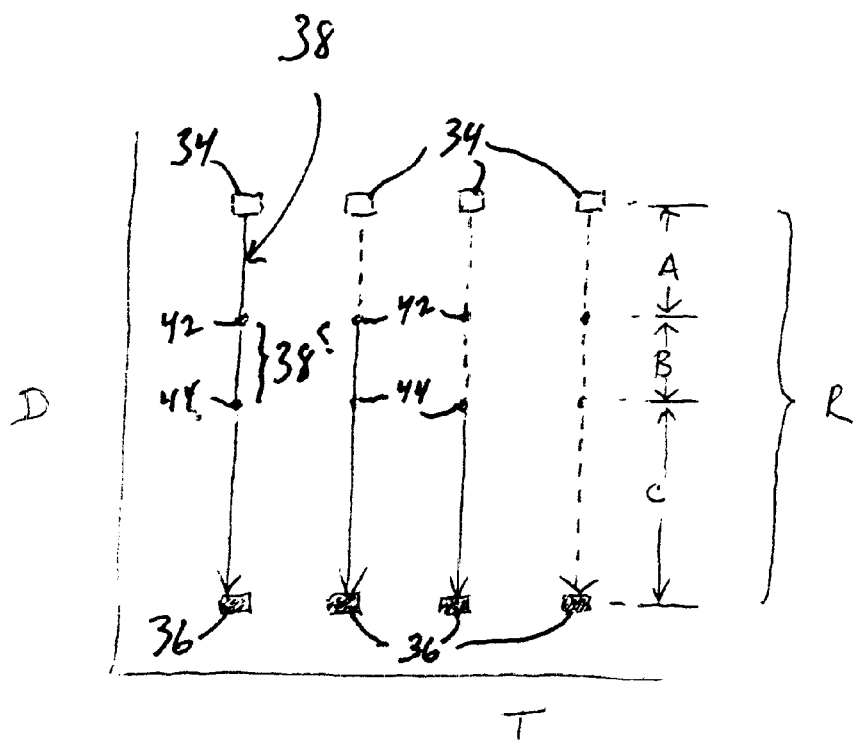
FIG. 5 is a graphical schematic illustration regarding how implementation of the practice of the invention takes place with respect to an aircraft moving from one waypoint site to another on the grounds of an airport along routes that extend between different selected pairs of waypoints.

With a bit of attention now focused on FIG. 5, presented here is a graphical picturing of how the system of this invention operates in relation to controlled motion of a specific aircraft. The vertical axis which is labeled "D" relates to route distance, the horizontal axis, which is labeled "T", can be thought of as representing a timeline progressing from later at the left to earlier at the right, and the four, vertical, line-like representations represent the assembled construction of an assigned route from a beginning point, such as point 34, to a destination point such as point 36. Small darkened dots which appear along lines that extend between points 34, 36 in FIG. 5 represent waypoints along the pictured route, and in FIG. 5, two of such waypoints have been chosen with reference to route 38, these two points being waypoints 42, 44.

The solid line that extends between points 34, 36 in FIG. 5 at the left side of that figure indicates that aircraft 24 has not yet begun its travel. The next illustration to the right in FIG. 5, where a dashed line appears extending downwardly from block 34, and ending at point 42, illustrates a case where all instructions for travel up to waypoint 42 have been completed, and have been deleted. Still to be completed are instructions relevant to the remainder of route 38 which extends from waypoint 42 to destination point 36. The third representation from left to right in FIG. 5 illustrates a condition where all travel instructions up to waypoint 44 have been completed, with prior instructional information now deleted. Finally, the right-most illustration in FIG. 5 pictures the state of things when the aircraft has in fact arrived at destination point 36, under which circumstances all prior instructions for the entire route have been deleted.

Figure 6:
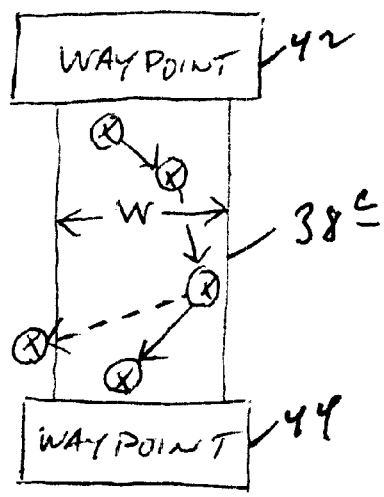
FIG. 6 illustrates schematically operation of, and response to, practice of the present invention, specifically with regard to aircraft travel between two waypoints.

FIG. 6 illustrates certain operational features of the present invention between any two adjacent waypoints. In FIG. 6, waypoints 42, 44 are pictured in block form. The two spaced slender lines which extend between waypoints 42, 44 in FIG. 6, the distance between which is labeled "W", represent the lateral boundaries of the assigned route leg 38c. Circled "X" marks in FIG. 6 represent specific positions of an aircraft along leg 38c, and the arrows between certain ones of these circled "X"s represents the actual path that has been, or is being, followed by an aircraft. So long as the aircraft follows all speed direction and lateral boundary constraints, in accordance with received instructions, no kind of warning needs to be generated, and the aircraft can make its way without incident or report of any difficulty along the path like that pictured by the circled "X" marks that are within the boundaries of the two slender lines in FIG. 6. If, however, something occurs which causes the aircraft, for example, to move outside of the boundaries of the assigned route path, and this is illustrated by a single circled "X" mark on the left side of FIG. 6, appropriate warnings are given both within the environment of the aircraft, and at the location of the work station for the associated ground controller. Corrective action is signaled to be needed at that point, and such corrective action might include the system transmission of revised future instructions from the ground controller.

With regard to support vehicles, such as fuel trucks, on the ground, the system and method of this invention is employed preferably in a manner much like that just discussed for controlled aircraft.

It will be evident, therefore, that the present invention offers a significantly improved environment for the accurate and non-confusing or cluttered control of aircraft and other vehicles moving on the grounds of an airport. Real-time, dense voice traffic, so prevalent and problematic today, is handily avoided. Given ground-control instructions are clear, and are repeatable at the selection of the recipient, and "replay" of instructions does not require voice contact with a ground controller.

Accordingly, while a preferred embodiment and manner of practicing the present invention have been illustrated and described herein, it will be appreciated that variations and modifications may be made without departing from the spirit of the invention.

We claim:

1. An aircraft and ground-support-vehicle ground-control system including
   an onboard subsystem including computer structure installable in an aircraft or other vehicle, which aircraft or other vehicle also includes a spatial navigational system,
   a ground-control subsystem designed for selective two-way communication with said onboard subsystem, and including computer structure installable, at least in part, generally at the location of a ground-control facility located at an airport,
   a pre-established database structure operatively associated with said ground-control subsystem and including audio and visual-data files containing selected ground-control instructions in the forms of (a) spoken directions, and (b) visually presentable directions including (1) representational ground map and signal-light data, (2) waypoints, and (3) routes between waypoints defined, inter alia, by spatial coordinates, boundaries, and speed and direction of travel information regarding waypoints and routes, and
   assembly tools operatively associated with said ground-control subsystem and said database structure, employable by a ground controller to create a transmittable, full package of ground-travel instructions to an aircraft or other vehicle as a precursor to the beginning of controlled travel for that aircraft or other vehicle on the grounds of the associated airport, with such full package possessing the capability of furnishing to the crew on board such an aircraft, and/or the operator of another kind of vehicle, the only necessary ground-control discussion between a ground-controller and crew or vehicle operator.

2. The system of claim 1 which further comprises, as a part of said onboard subsystem, marker enabling structure operable, with respect to a controlled aircraft or other vehicle, and in relation to a transmitted package of ground-control instructions which has been received by that aircraft or vehicle, to present, on a waypoint-based route map contained in such instructions, further aided by the possession on board the craft or other vehicle of GPS information that is made available by such GPS navigational system equipment, a visible, mobile marker that pictures, in real time, the location of the aircraft or other vehicle on such a map.

3. The system of claim 1, wherein, in relation to transmitted and received instructional information, said onboard subsystem includes information-deletion structure operable to discard from that subsystem instructional components of the received information which are no longer necessary for ongoing controlled travel of an aircraft or other vehicle.

4. The system of claim 1, wherein, in relation to transmitted and received instructional information, said onboard subsystem includes replay structure which enables the crew on board the associated aircraft, or the operator of another vehicle, to replay selected components of the received information.

5. A communication system for managing the movement of aircraft and other vehicles on the grounds of an airport comprising
   non-voice, data-transmission/-reception apparatus including computer-based data-transmission/-reception subapparatus operatively present in an airport's ground-control facility, and in each aircraft or other vehicle intending to use the system on the airport's grounds,
   each said subapparatus including (a) grounds-map and signal-light display structure operable selectively to display both an airport grounds map containing pictorial, grounds-travel route information relevant to an aircraft or other vehicle positioned on the related airport's grounds, and (b), an animatable, positionally-shiftable marker which visually indicates on such a map each specific aircraft's or other vehicle's actual and/or recommended position.

6. An airport ground-control method for controlling the travel of aircraft on the grounds of an airport comprising establishing a database of ground-travel visual and aural instructional materials for delivery to an aircraft whose travel on airport grounds is to be controlled, such data including route and mapping information, as well as information regarding locations, such as waypoints, that relate to travel of an aircraft under control, and prior to a control-craft's controlled travel on such grounds, assembling for delivery to such an aircraft, and from such database, an appropriate, specific package of travel-control instructions which can be delivered, selectively, as a unit and precursor to aircraft travel, which package, after delivery to, and reception by, the related aircraft, includes portions that, without further remote transmission and delivery to the aircraft, can be reviewed recurrently and repeatedly at the selection of personnel on board the aircraft, and delivering that package to the associated aircraft.

7. The method of claim 6 which further includes furnishing system equipment to an airport's ground-control facility and to participating aircraft and using that equipment for said establishing, assembling, delivering and receiving activities, and, with respect to such system equipment on board a participating aircraft, responding to a controlled-craft's response with aural and/or visual indicia relating to that response.

8. The method of claim 6 which further includes the removing access to selective portions of received information that relate to travel-control instructions that have already been followed substantially to completion.

9. The method of claim 7, wherein visual indicia response activity includes presentation, within the environment of the control aircraft, of map information accompanied with a moving marker visually indicating the real-time position of the aircraft on that map information.

10. An airport aircraft ground-control method for effecting aircraft and other vehicle ground control at a selected airport, and with respect to such an airport and an aircraft or other vehicle equipped to practice the method, said method comprising creating, in operative association with an airport ground-control facility, a control instruction database relating to waypoints and routes of travel between waypoints that are combinable to define a control movement path for an aircraft or another vehicle on the grounds of the airport, with respect to a specific aircraft or other vehicle which is to be controlled on such grounds, assembling a packet of instructional information from such database, organized in the form of groups of data which are specific to routes of travel existing between pairs of selected waypoints, delivering such data groups within a unitary, singular package of information (instructional package) that is transmitted to an aircraft or other vehicle awaiting ground control, within the environment of that aircraft or other vehicle, selectively presenting, for control purposes, instructions contained in the delivered package, with such presenting taking place on a waypoint-by-waypoint, data-group basis, including presenting one or more constructional components in the form of aural instruction and/or text instruction, and/or map-display visual instruction, and from onboard the aircraft or other vehicle, and with respect to a transmitted and received instructional package, and without the necessity for further instructional information being transmitted from the database, tracking the aircraft's or other vehicle's response to the delivered instructions in a manner which furnishes advisories and warnings at least within the environment of the aircraft or other vehicle regarding any movement deviation from received ground-control instructions.

11. The method of claim 10 which further includes selectively modifying the specific information to be followed by a ground-controlled aircraft of other vehicle, and transmitting a modified package of instructional information, which may include one or more data groups, to the subject aircraft or other vehicle for subsequent control purposes.

12. The method of claim 10, wherein each data group of transmitted ground-control instructional information may selectively include the capability of presenting, on the basis of real-time position data, such as GPS-position data, visual animated markers picturing the location of the controlled aircraft or other vehicle on a pictorial display which forms part of the transmitted informational control package.

13. The method of claim 10 which further includes the capability, on board a controlled aircraft or other vehicle that is operating under the control of a delivered control-instruction package, to delete, as no longer necessary, data-group information relating to predecessor routes between waypoints that have already been passed by controlled-aircraft or other vehicle travel.

14. The method of claim 10 which further includes, from on board a controlled aircraft or other vehicle, providing the capability from crew on board that aircraft, or the operator of another vehicle, to call for a repeated presentation of specific instructional information contained in a data group which is relevant to travel then taken place between a pair of adjacent waypoints.

15. An airport aircraft ground-control method for effecting aircraft ground control at a selected airport with respect to an aircraft equipped to practice the method comprising creating, relative to a subject airport, a control-instruction database including components (instructional components) regarding waypoints and routes of travel therebetween, which components are combinable to define a controlled movement path for an aircraft on the grounds of the airport, with respect to control over a specific aircraft, assembling from such database a selectable and defined packet of instructional components relating to a specific route of travel on the grounds of the airport, delivering the assembled packet as a unitary singularity precursor package of information to an aircraft awaiting ground control, within the environment of that aircraft, selectively presenting to on board crew travel instructions derived from the delivered package, with such presenting including delivery one or more instructional components in the form of aural instruction, textual instruction and map-display visual instruction, and from on board the aircraft, and with respect to the received instructional package, and about the necessity for further instructional information being transmitted from the database, tracking the aircraft's response to the delivered instructions in a manner which furnishes advisories and warnings at least within the environment of the aircraft respecting any aircraft movement deviation from received ground-control instructions.

16. The method of claim 15 which further includes selectively modifying the specific information to be followed by a ground-controlled aircraft, and transmitting a modified package of instructional components.

17. The method of claim 15, which further includes presenting on an appropriate map display of the airport a visual, moving marker which pictures the location of the controlled aircraft on that display.

18. The method of claim 15 which further includes, from on board a controlled aircraft, deleting as no longer necessary, control information relating to instructions which have already been followed.

19. The method of claim 15 which further includes providing an opportunity for crew on board a controlled aircraft to request from a delivered packet of instructional information a repeated presentation of specific portions of such information.

* * * * *